May 3, 1966  J. M. RAGONA  3,248,993
TEACHING AID FOR MUSIC NOTES AND SCALES
Filed June 1, 1964
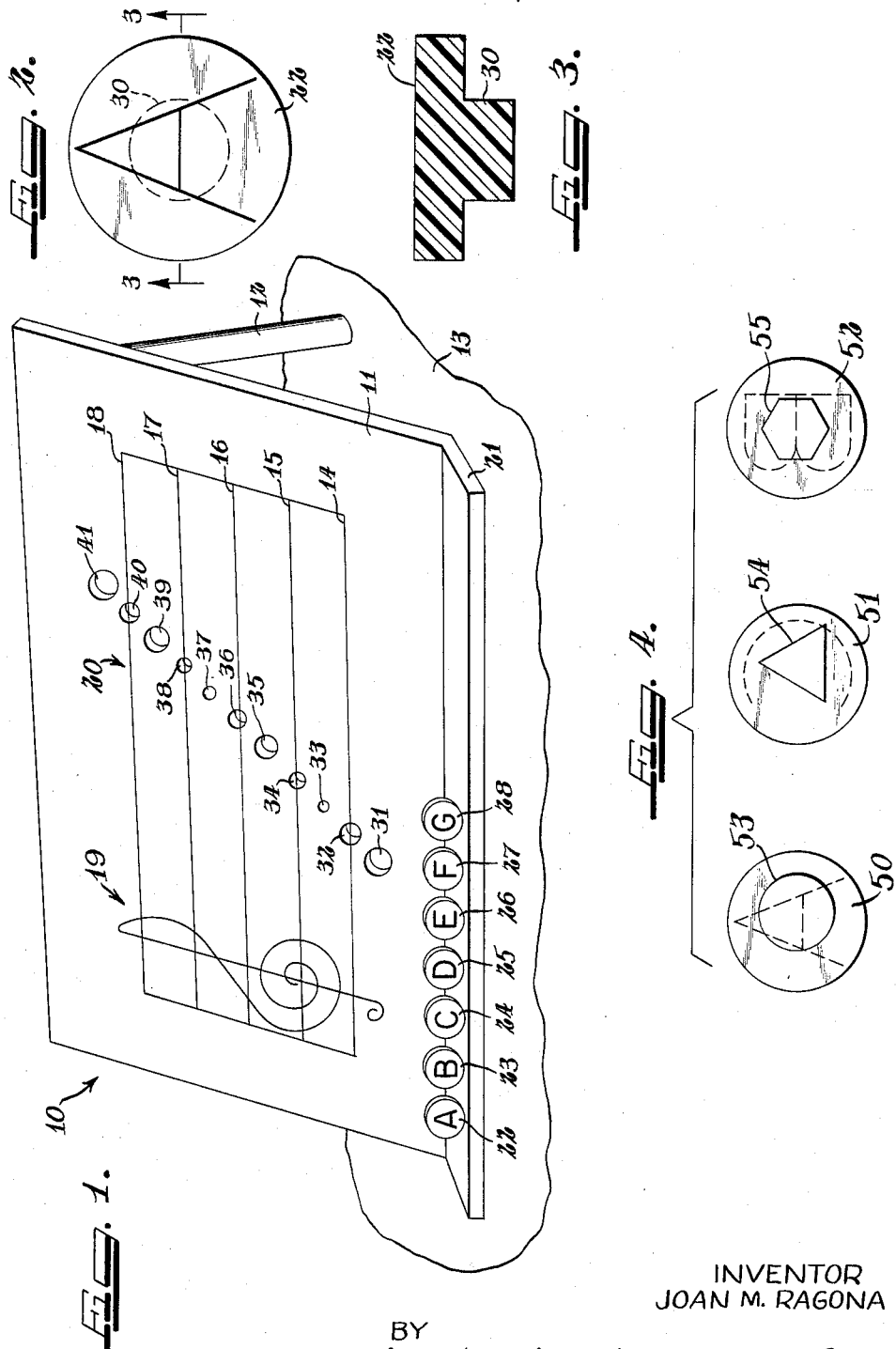
INVENTOR
JOAN M. RAGONA
BY
Greist, Lockwood, Greenawalt & Dewey
Attys.

TEACHING AID FOR MUSIC NOTES AND SCALES
Joan M. Ragona, 2N619 York Road, Elmhurst, Ill.
Filed June 1, 1964, Ser. No. 371,413
1 Claim. (Cl. 84—472)

This invention relates to a teaching aid for use in the instruction of music notes and scales. More specifically, the present invention is directed to an educational device which is particularly adapted to teach visual recognition of the relative positions of particular notes and scales on a staff having a particular pitch.

In the instruction of the youthful segment of society in the musical arts, various schemes have been employed to teach visual recognition of the location of the various notes appearing on a staff of a particular pitch. For example, one of the older schemes to identify notes falling on the lines of the staff in the treble clef is to remember the phrase "Every good boy does finely," with the initial letter of each of these words denoting the associated note, starting from the bottom of the staff to the top in the treble clef. Notes falling between the lines will oftentimes be remembered by the word "face" that is, the four notes falling in the four spaces between the bottom and top lines of the staff in the treble clef. While these time honored techniques have their merit, word schemes appear to fall short of generating the necessary enthusiam in the prospective youthful musician.

The present invention proposes a solution to this problem which enables the beginning musician to develop acuity in memorizing the notes and scales through the cooperative efforts of mind and hand. A game-like flavor is provided for the student musician who uses the present invention without detracting from the effectiveness of the education in recognizing the relative position or location of each of the notes as it falls on the staff of a particular pitch.

A more comprehensive understanding of the present invention and a deeper appreciation of the more salient features thereof will become readily apparent upon a consideration of the objects to be accomplished and a detailed description of the unique structure employed in the achievement of these objectives.

It is therefore an object of this invention to provide a teaching aid particularly adapted for use in the instruction of musical notes and scales.

It is a further object of this invention to provide an educational device for use in the instruction of beginning music students to enhance the ease with which they may learn musical notes and scales.

It is a further object of this invention to provide an educational device for musical education including a plate-like board with a musical staff thereon, and a series of apertures for reception of an appropriately marked musical note, the notes being placed in each of the apertures by the student.

Further and fuller objects will become readily apparent when reference is made to the accompanying drawings wherein:

FIG. 1 is a perspective view of the teaching aid of the present invention resting on a support surface which is illustrated fragmentarily;

FIG. 2 is an enlraged view of a simulated musical note;

FIG. 3 is a cross sectional view taken along the lines 3—3 of FIG. 2; and

FIG. 4 is a bottom plan view of simulated notes of modified form.

Referring now to FIG. 1, reference character 10 indicates the teaching aid of the present invention including a plate-like board or holder 11 having an easel-like support 12 resting upon a suitable supporting surface 13. The plate-like board or holder 11 may be formed of any suitable material such as wood, plastic, sheet metal or the like and has inscribed, imprinted or suitably noted thereon a series of lines 14–18 disposed in substantial parallelism to form a staff.

A suitable symbol 19 may be provided to one side of the staff 20 to indicate the appropriate pitch under consideration. For example, the symbol may be any one of the known forms which designate pitch, for example, the key of F, G or C. The former two keys are more popularly identified as treble and bass clef. It is contemplated that the pitch symbol which as illustrated, indicates the treble clef, may be either imprinted, or removably attached to the staff 20.

A ledge or holder 21 may be provided at the lower margin of the plate-like holder 11 for storing the simulated notes identified by reference numerals 22–28. As is evident from inspection of FIG. 1, each of the simulated notes 22–28 is of identical configuration when viewed from the front, and each is provided with suitable indicia, for example, the letters of musical scales such as A, B, C, etc. to permit visual distinguishment of the various notes each from the other.

The note 22 is illustrated in the plan view of FIG. 2 on an enlarged scale, with dotted lines 30 identifying a raised boss portion on the underside or expressed another way, on the side opposite the indicia or lettering. As seen in FIG. 3, the note 22 when viewed in diametric cross section is generally T-shaped with the raised boss portion 30 being of somewhat less diameter than the balance of the note 22. Each of the notes 23–28 may be of like or similar construction.

In FIG. 1, a series of apertures 31–41 are arranged so that those indicated by the odd reference characters fall between the lines or degrees, while the evenly referenced apertures 32–40 fall on the lines or degrees 14–18. It is contemplated that each of the apertures 31–41 will be somewhat different than the other, for example, may differ in size, shape or the like for purposes to become apparent. Is is desirable, though not necessary, that the differences be of such small magnitude so as to be undetected by the human eye.

In the employment of the teaching aid 10 of the present invention, the youthful student, when requested to identify the various positions of the particularly notes, for example, the note A, will select the appropriately labeled simulated note 22 and insert the lower portion 30 thereof in the aperture 35 between lines 15 and 16 on the staff 20.

The aperture 35 and raised boss portion 30 of the simulated note 22 will be appropriately dimensioned so that the simulated note 22 will be retained on the board member 11 when properly placed. Assuming for example, the student should attempt to insert the simulated note 22 on the line 15 or 16, the raised boss portion 30 of the note will be too large for the aperture or alternatively will be too small to be retained, depending upon the dimensions of the simulated note and associated aperture. Each simulated note has one and only one proper place on the staff. While the present arrangement of apertures is shown on a diagonal line across the staff it is contemplated that the apertures may be arranged in any desired fashion.

Referring now to FIG. 4, modified forms of simulated notes are illustrated therein at 50, 51 and 52. Each of the notes 50–52 is illustrated as viewed from the underside or with the raised boss visible. The note 50 is provided with an eccentrically disposed raised boss portion 53 of reduced diameter with respect to the front face of the note and as described above is not visible to the student unless turned over. It is contemplated that the letter on the face (A shown in dotted lines) of the simulated note will normally be in an upright position when the student attempts placement in the appropriate aperture on the staff 20. In this manner, when the student selects the simulated note, he does so by the letter on its face rather that attempting to geometrically match the insertable boss portion with the appropriate aperture on the staff with disregard to the indicia or letter on the simulated note. In connection with the simulated note 50, it is contemplated that associated apertures therefor across the staff 20 may be of identical size, with the eccentricity of the raised boss portion 53 positioned so that the letter on the simulated note 50 will be vertically disposed only when the note is appropriately placed.

The simulated note 51 illustrates a triangular boss portion 54 which may be used in conjunction with suitably shaped apertures on the musical staff 20. In a similar fashion, the hexagonal raised boss 55 on the note 52 is also appropriate to limit the placement of the proper note to the appropriate place on the staff 20. Obviously, the modified forms of FIG. 4 are exemplary of only a few of the many forms which the simulated note may take. For example, each raised boss portion on the note may be cylindrical with a spline portion suitably shaped or positioned to limit the insertion to only one aperture on the staff, this being the correct position of the note.

In one embodiment, the openings 31–41 were formed of equal diameter and were provided with closed bottom portions. The co-operating simulated notes were formed of a complementary dimension. Dowels, eccentric pegs and the like were positioned in the bottom portion and co-operated with suitable means on the simulated note to limit the placement of the note to the appropriate opening.

It is to be understood that concerted or part music comprising two staffs joined by a brace may be provided on the plate-like holder notwithstanding the fact that the present description is limited to a single staff. Obviously, drills with scales can be performed as well as recognition of scales in various keys.

It will become immediately obvious to those skilled in the art that numerous other departures are possible without deviating from the inventive concepts embodied herein and therefore any limitations imposed are to be within the spirit and scope of the appended claim.

I claim:

A device for use as a teaching aid in the study of music notes and scales comprising a generally plate-like holder adapted to rest on a supporting surface, a series of lines on said plate-like holder disposed in substantial parallelism with each other thereby to form a musical staff, means on said staff identifying the absolute pitch of said staff, a series of apertures arranged on said staff on said lines and in the spaces therebetween as well as above and below the first and last lines forming said staff, each of said apertures having a differently dimensioned opening from the other, the arrangement of said apertures being substantially in the position of musical notes, a series of simulated notes having indicia means on a face side thereof permitting visual identification of the appropriate letter of said note, and means on the other side of said simulated note consisting of a shaped boss for co-operation with a correspondingly shaped one of said apertures to limit insertion of said means on said simulated note into the appropriate one of said aperture on said staff corresponding with the indicia means on said note thereby to teach visual recognition of the relative position of said notes on said staff.

References Cited by the Examiner

UNITED STATES PATENTS

| | | | |
|---|---|---|---|
| 163,912 | 6/1875 | Birmeli | 35—73 X |
| 1,412,587 | 4/1922 | Willoughby | 84—471 |
| 1,805,488 | 5/1931 | Jolls | 84—471 |
| 2,415,342 | 2/1947 | Donner | 35—35 X |
| 2,623,303 | 12/1952 | Mindel | 35—22 |
| 2,971,275 | 2/1961 | Provenzano | 35—31 |
| 3,010,228 | 11/1961 | Torre | 35—73 |
| 3,077,677 | 2/1963 | Malkin et al. | 35—35 |

LEO SMILOW, *Primary Examiner.*

CHARLES M. OVERBEY, *Assistant Examiner.*